United States Patent [19]

Montgomery

[11] Patent Number: 4,638,834
[45] Date of Patent: Jan. 27, 1987

[54] TAPPING SADDLE

[76] Inventor: Ronald S. Montgomery, 1308 Cherry St., Gainesville, Tex. 76240

[21] Appl. No.: 778,362

[22] Filed: Sep. 20, 1985

[51] Int. Cl.⁴ .................. F16K 43/00; F16K 51/00
[52] U.S. Cl. .................................. 137/315; 137/317; 137/318; 285/197
[58] Field of Search .................... 137/315, 317, 318; 285/197, 198, 199

[56] References Cited

U.S. PATENT DOCUMENTS

| | | | |
|---|---|---|---|
| 2,611,631 | 9/1952 | Benson | 285/197 |
| 3,298,717 | 1/1967 | Rothwell et al. | 285/197 |
| 3,307,435 | 3/1967 | Floren | 137/318 |
| 3,533,650 | 10/1970 | Smith | 285/197 |
| 3,694,009 | 9/1972 | Phillips | 285/197 |
| 3,779,272 | 12/1973 | Dunmire | 285/197 |
| 3,939,882 | 2/1976 | Gillemot | 285/197 |
| 4,135,258 | 1/1979 | Braga et al. | 285/197 |

FOREIGN PATENT DOCUMENTS

| | | | |
|---|---|---|---|
| 2454833 | 5/1976 | Fed. Rep. of Germany | 285/197 |
| 8101374 | 5/1981 | Sweden | 285/198 |

*Primary Examiner*—George L. Walton
*Attorney, Agent, or Firm*—Hubbard, Thurman, Turner & Tucker

[57] ABSTRACT

Disclosed is a tapping saddle for establishing a lateral connection to a pipe. The tapping saddle includes a tapping valve that is held against the pipe by a flexible metal band. The flexible band has a plurality of lengthwise extending spaced apart holes adjacent one of its ends. The flexible metal band is held about the pipe by a first lug fixedly connected to one end of the band and a movable lug positioned on the other side of the band adjacent the first lug. The lugs are connected and drawn together by a bolt that passes through a selected one of the holes in the band. A tab is positioned between the first lug and the band and urges the band into clamping engagement with the second lug when the first and second lugs are drawn together by the bolt.

2 Claims, 2 Drawing Figures

TAPPING SADDLE

BACKGROUND OF THE INVENTION

A. Field of the Invention

The present invention relates generally to tapping saddles and more particularly to a tapping saddle that may be used to establish connections on a wide variety of pipe diameters.

B. Description of the Prior Art

Tapping saddles are used to make lateral connections to large diameter pipes. For example, in municipal water systems, residential connections are established by tapping into the large diameter water main with a smaller diameter service line connected to the residence.

Typically, tapping saddles are made from castings which include a first semicircular section having a tapping valve integrally formed therewith and a second semicircular section. The semicircular sections are rigid and have an inside diameter substantially equal to the outside diameter of the pipe to be tapped. The semicircular sections are bolted together.

Most piping systems include pipes of various outside diameters. Accordingly, it is necessary for operators to inventory a large number of tapping saddles of various sizes. The necessity to carry large inventories is costly to the operators.

There have been proposed tapping saddles that could be used to tap into pipes of different diameters. Examples of such tapping saddles are disclosed in Dunmire of U.S. Pat. No. 3,779,272 and German Offenlegungsschrift No. 2454833. However, for one reason or another, such adjustable tapping saddles have not become generally accepted and have not supplanted the cast saddles.

Accordingly, it is an object of the present invention to provide a tapping saddle that overcomes the shortcomings of the prior art. More particularly, it is an object of the present invention to provide a tapping saddle that may be used to tap into pipes of varying outside diameter. It is a further object of the present invention to provide a tapping saddle for use with varying diameter pipes that is inexpensive to manufacture and easy to install.

SUMMARY OF THE INVENTION

Briefly stated, the foregoing and other objects are accomplished by the tapping saddle of the present invention, which includes a tapping valve and a flexible metal band connected to the tapping valve. The metal band has first and second ends and is long enough to encircle the pipe to be tapped. The metal band includes a plurality of lengthwise spaced apart holes adjacent its second end. A first lug is connected to the first end of the pipe and a second lug is positionable adjacent to the first lug with the metal band positioned therebetween. A bolt or bolts are provided to pass through a selected one of the holes and draw the first and second lugs together. A tab is disposed between the first lug and the metal band for urging the metal band into contact with the second lug when the first and second lugs are drawn together.

DESCRIPTION OF THE PREFERRED EMBODIMENT

Figure 1:
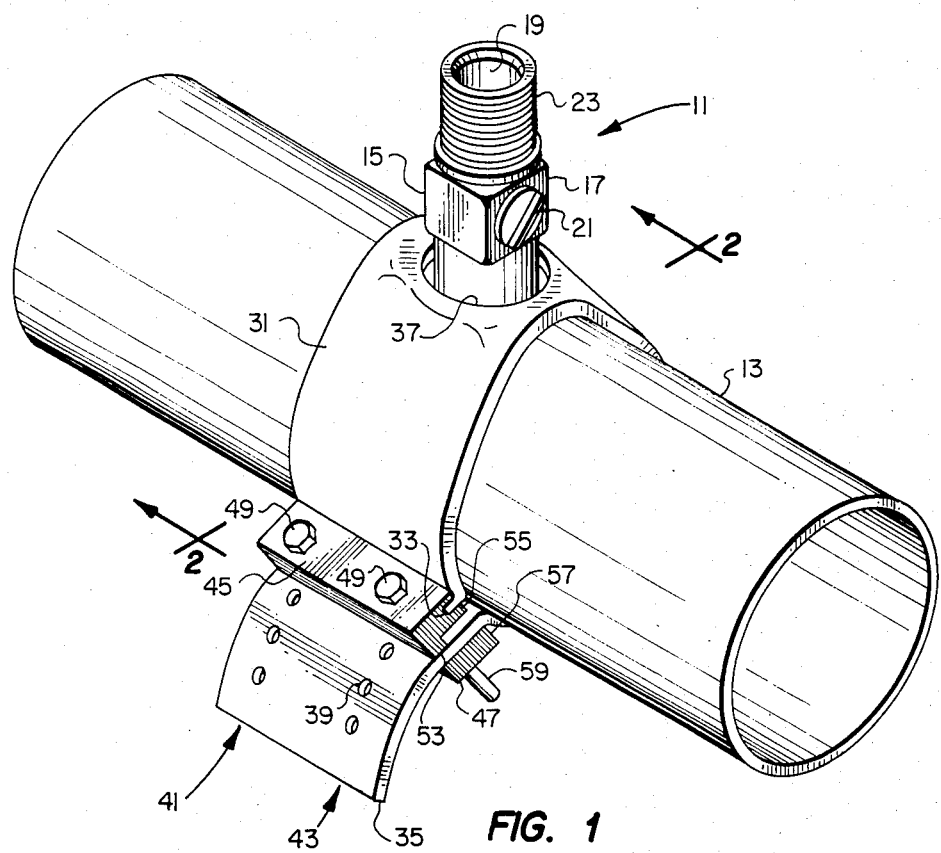
FIG. 1 is a prospective view of the tapping saddle of the present invention in position about a pipe.
Figure 2:
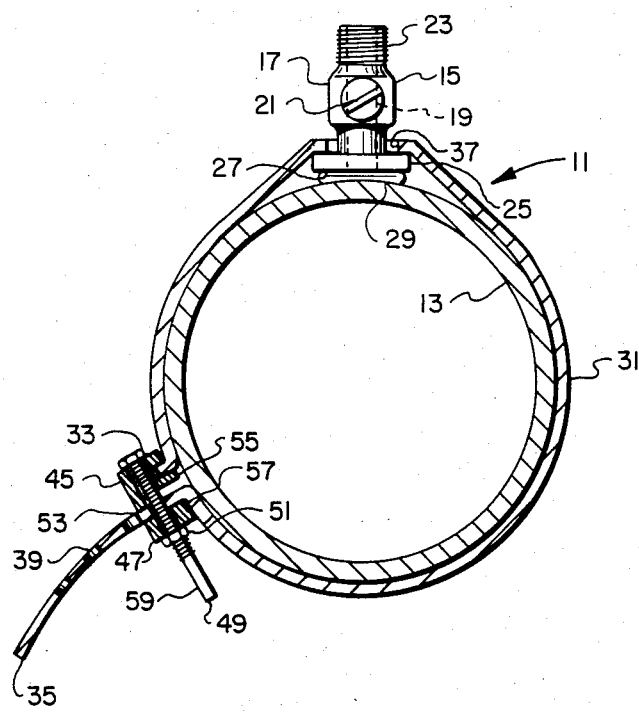
FIG. 2 is a sectional view taken along line 2—2 of FIG. 1.

Referring now to the drawing, the tapping saddle of the present invention is designated generally by the numeral 11. Tapping saddle 11 is adapted for establishing a lateral connection to a pipe 13.

Tapping saddle 11 includes a tapping valve 15. Tapping valve 15 includes a valve body 17 with a bore 19 therethrough. A valve member (not shown) is mounted in valve body 17 and is movable by means of a operator 21 between open and closed positions with respect to bore 19.

Valve body 17 is threaded at its upper end 23 for establishing a connection with a branch line (not shown). Valve body 17 includes at its lower end an outwardly extending flange 25. The bottom surface 27 of flange 25 is substantially flat and has an O-ring seal 29 affixed thereto.

Valve body 17 is positioned on and connected to pipe 13 by means of a flexible metal band 31. Metal band 31 has a first end 33 and a second end 35. The length of metal band 31 between ends 33 and 35 is sufficient to encircle pipes throughout the range of sizes to be tapped. Metal band 31 includes between ends 33 and 35 a hole 37 having a diameter large enough so that all of valve body 17, except flange 25, can fit through it. Metal band 31 also includes adjacent second end 35 a plurality of lengthwise spaced apart holes 39. Holes 39 are disposed in parallel rows designated generally by the numerals 41 and 43 adjacent the edges of metal band 31. The lengthwise spacing between holes 39 is selected to correspond to circumferences appropriate to various outside diameter pipes to be tapped.

Metal band 31 is held about pipe 13 by a pair of lugs, including a first lug 45 and a second lug 47. First lug 45 is an elongated bar that is fixedly connected to first end 33 of metal band 31. Second lug 47 is a bar that is not fixedly connected to metal band 31 but is positionable on the outside surface of metal band adjacent selected holes 39. First lug 25 and second lug 27 are connected and drawn together by a pair of bolts 49. Each bolt 49 passes through first lug 45 and second lug 47 and a selected hole 39. Bolt 49 is retained by a conventional nut 51. As nut 51 is tightened, lugs 45 and 47 are drawn toward each other to tighten band 31 about pipe 13 and to compress O-ring 29 to conform and seal with the outside surface of pipe 13.

First lug 45 includes a tab 53 that is positioned to engage the inside surface of metal band 31 adjacent second lug 47. Preferably, tab 53 is in the form of an elongated bar that is welded to or integral with first lug 45. As nut 51 and bolt 49 are tightened, metal band 31 is tightly clamped between tab 53 and second lug 47. The clamping action of tab 53 and second lug 47 contributes to the holding power of the lugs and prevents bolt 49 from ripping through the material between holes 39. Also, tab 53 is positioned radially outward of bolt 49 with respect to pipe 13. Thus, as lugs 45 and 47 are drawn together by bolt 49 and nut 51, their bottomsides 55 and 57, respectively, are rotated toward each other. The rotation of lugs 45 and 47 contributes to the tightening of metal band 31 on pipe 13.

Bolt 49 is made long enough so that it may be inserted through first lug 45, metal band 31, and second lug 47. While metal band 31 is flexible, it is still moderately stiff when it is being worked with by hand. Accordingly, it is desirable that bolt 29 be long in order to facilitate hand assembly. However, bolt 29 is substantially longer than it needs to be in order to draw and hold together lugs 45 and 47. With the substantial extra length, a worker would be required to turn nut 51 over a considerable length before nut 51 starts to draw together lugs 45 and 47. Accordingly, in the preferred embodiment, bolt 49 includes an unthreaded end 59. Unthreaded end 59 serves as a pilot or guide during assembly, and allows nut 51 to be slipped thereover and down to the threaded portion of nut 49 when lugs 45 and 47 are drawn together.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size, and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A tapping saddle for establishing a lateral connection to a pipe which comprises:
    a tapping valve;
    a flexible metal band connected to said tapping valve, said metal band having first and second ends with a length therebetween sufficient to encircle the pipe, said metal band including a plurality of holes spaced apart lengthwise on said band adjacent said second end;
    a first lug connected to said first end of said metal band;
    a second lug positionable adjacent said first lug with said second end of said metal band extending between and beyond said first and second lugs;
    bolt means passing through one of said holes for drawing together said first and second lugs;
    and urging means disposed between one of said lugs and said second end of said metal band for urging said second end of said metal band into contact with the other of said lugs when said first and second lugs are drawn together, and said urging means includes a tab connected to one of said lugs radially outward of said bolt means and engageable with the extended second end of said metal band for causing said first and second lugs to rotate as the metal band is tightened on the pipe.

2. The tapping saddle as claimed in claim 1, wherein said tab is connected to said first lug.

* * * * *